United States Patent
Li et al.

(10) Patent No.: US 11,421,365 B2
(45) Date of Patent: Aug. 23, 2022

(54) CONTROL METHOD OF MULTI-DRUM WASHING MACHINE

(71) Applicant: QINGDAO HAIER DRUM WASHING MACHINE CO., LTD., Shandong (CN)

(72) Inventors: Wenwei Li, Shandong (CN); Jun Wu, Shandong (CN); Rongshuai Cai, Shandong (CN); Haibo Wang, Shandong (CN); Guangfeng Wang, Shandong (CN); Yubao Wang, Shandong (CN); Guanghui Pan, Shandong (CN)

(73) Assignee: QINGDAO HAIER DRUM WASHING MACHINE CO., LTD., Shandong (CN)

( * ) Notice: Subject to any disclaimer, the term of this patent is extended or adjusted under 35 U.S.C. 154(b) by 542 days.

(21) Appl. No.: 16/471,349

(22) PCT Filed: Dec. 21, 2017

(86) PCT No.: PCT/CN2017/117631
§ 371 (c)(1),
(2) Date: Jun. 19, 2019

(87) PCT Pub. No.: WO2018/113715
PCT Pub. Date: Jun. 28, 2018

(65) Prior Publication Data
US 2020/0087833 A1    Mar. 19, 2020

(30) Foreign Application Priority Data
Dec. 21, 2016   (CN) .......................... 201611191698.5

(51) Int. Cl.
*D06F 19/00* (2006.01)
*D06F 23/00* (2006.01)
(Continued)

(52) U.S. Cl.
CPC .............. *D06F 33/36* (2020.02); *D06F 19/00* (2013.01); *D06F 23/00* (2013.01); *D06F 29/00* (2013.01);
(Continued)

(58) Field of Classification Search
None
See application file for complete search history.

(56) References Cited

U.S. PATENT DOCUMENTS

| 2,680,084 A | 6/1954 | Ryan |
| 3,958,434 A | 5/1976 | Grunbaum |

(Continued)

FOREIGN PATENT DOCUMENTS

| CN | 201567472 U | 9/2010 |
| CN | 102660853 A | 9/2012 |

(Continued)

OTHER PUBLICATIONS

Wen, "CN201567472U English machine translation.pdf", Sep. 1, 2010—Machine translation from Espacenet.com.*

(Continued)

*Primary Examiner* — Levon J Shahinian
(74) *Attorney, Agent, or Firm* — Buchanan Ingersoll & Rooney PC

(57) ABSTRACT

The present disclosure discloses a control method of a multi-drum washing machine. The control method includes setting an oscillating program in the multi-drum washing machine. The oscillating program is a program in which oscillation generated by at least one washing device is used as an oscillating source to drive washing water and laundries in another at least one washing device to generate an interaction and achieve a washing effect. When at least one washing device oscillates, another at least one washing device and washing water and laundries in the washing (Continued)

device are driven to oscillate; and the vibration or jumping of the washing water in a drum is used to realize a function of soft washing of laundries and solve the problem of washing damage to soft laundries due to agitating type washing or beating type washing.

20 Claims, 2 Drawing Sheets

(51) Int. Cl.
*D06F 29/00* (2006.01)
*D06F 31/00* (2006.01)
*D06F 33/00* (2020.01)
*D06F 33/36* (2020.01)
*D06F 37/02* (2006.01)
*D06F 43/04* (2006.01)
*D06F 103/24* (2020.01)
*D06F 105/48* (2020.01)
*D06F 105/54* (2020.01)

(52) U.S. Cl.
CPC ............ *D06F 31/00* (2013.01); *D06F 31/005* (2013.01); *D06F 33/00* (2013.01); *D06F 37/02* (2013.01); *D06F 43/04* (2013.01); *D06F 2103/24* (2020.02); *D06F 2105/48* (2020.02); *D06F 2105/54* (2020.02)

(56) References Cited

U.S. PATENT DOCUMENTS

| | | |
|---|---|---|
| 2010/0275381 A1 | 11/2010 | Ko et al. |
| 2014/0182065 A1 | 7/2014 | Lin |
| 2015/0211173 A1 | 7/2015 | Lee et al. |

FOREIGN PATENT DOCUMENTS

| | | |
|---|---|---|
| CN | 102767062 A | 11/2012 |
| CN | 103852155 A | 6/2014 |
| CN | 204626045 U | 9/2015 |
| EP | 2980297 A1 | 2/2016 |
| JP | S5911891 A | 1/1984 |
| JP | S6029518 B2 | 7/1985 |
| JP | H01218498 A | 8/1989 |
| JP | 2001178986 A | 7/2001 |

OTHER PUBLICATIONS

International Search Report (with English translation) and Written Opinion issued in corresponding International Patent Application No. PCT/CN2017/117631, 11 pages (dated Mar. 12, 2018).

\* cited by examiner

CONTROL METHOD OF MULTI-DRUM WASHING MACHINE

TECHNICAL FIELD

The present disclosure relates to a field of washing machines, and particularly relates to a control method of a multi-drum washing machine.

BACKGROUND

With the constant improvement of the living standards and quality of life, clothing of users adopts increasingly high-end and soft materials at the present. Agitating type washing of an ordinary pulsator washing machine or beating type washing of a drum washing machine may cause problems such as loosening or terylene breakage and fuzziness to clothes, so that the washing machines may not meet demands of the users.

In view of this, the present disclosure is particularly provided.

SUMMARY

The present disclosure provides a control method of a multi-drum washing machine. A multiple sets of washing devices mutually connected are used, when at least one washing device oscillates, other at least one washing device and washing water and laundries therein are driven to oscillate, and a function of soft washing of the laundries is realized by the vibration or jumping of the washing water therein. The present disclosure also fully saves energy and reduces the energy consumption of the washing machine.

In order to achieve the objective, the present disclosure adopts the following technical solution.

A control method of a multi-drum washing machine, the multi-drum washing machine comprising at least two sets of washing devices, the control method including setting an oscillating program in the multi-drum washing machine, and in the oscillating program oscillation generated by at least one washing device is used as an oscillating source to drive the washing water and laundries in other at least one washing device to generate an interaction for washing.

Further, the control method includes detecting oscillation information of a second washing device serving as the oscillation source in operation, judging whether a first washing device executes the oscillating program according to the oscillation information, and performing oscillating washing by cooperation with the second washing device; or, the control method comprises setting the oscillation information of the second washing device executing the oscillating program and serving as an oscillating source, and controlling the first washing device to cooperate with the second washing device to perform the oscillating washing.

Further, the control method includes acquiring the oscillation information of the second washing device after the first washing device is controlled to execute the oscillating program, acquiring an oscillating washing mode according to the oscillation information and performing the oscillating washing mode.

Further, the oscillation information includes washing progress information, and/or rotating speed information of a drum in the first washing device or second washing device.

Preferably, the washing progress information includes one or more than one stage selected from a group consisting of a soaking stage, a washing stage, a rinsing stage or a dewatering stage.

Further, the control method includes the following steps:

S1, starting a washing program of the first washing device;

S2, detecting the washing progress information in the operation of the second washing device, judging whether the washing progress information indicates a preset washing progress, if YES, executing Step S3, and if NO, executing a normal washing program; and S3, detecting the rotating speed information of the drum in the second washing device, acquiring an oscillating washing mode according to the rotating speed information of the drum and performing the oscillating washing mode.

Further, the preset washing progress in Step S2 includes a washing progress, and/or a dewatering progress.

Further, the oscillating washing mode includes one or any combination of situations that the second washing device drives the first washing device to perform the oscillating washing, or the first washing device and the second washing device alternately perform the oscillating washing.

Preferably, the rotating speed information of the drum in Step S3 corresponds to the oscillating washing mode, and a corresponding relation thereof is stored in the washing machine.

Further, if the washing progress information in Step S2 indicates the washing progress, and a rotating speed shown in the rotating speed information of the drum in Step S3 is greater than a first set rotating speed, the oscillating washing mode is that the first washing device and the second washing device is controlled to alternately perform the oscillating washing or the second washing device drives the first washing device to perform the oscillating washing.

Preferably, the first set rotating speed is in a range from 100 to 350 rpm.

More preferably, the first set rotating speed is in a range from 200 to 300 rpm.

Further, if the washing progress information in Step S2 indicates the dewatering stage, and a rotating speed shown in the rotating speed information of the drum in Step S3 is greater than a second set rotating speed, the oscillating washing mode is that the second washing device drives the first washing device to perform the oscillating washing.

Preferably, the second set rotating speed is greater than 500 rpm.

More preferably, the second set rotating speed is greater than 600 rpm.

Further, if the oscillating washing mode in Step S3 is that the second washing device drives the first washing device to perform the oscillating washing or the first washing device and the second washing device is controlled to alternately perform the oscillating washing, the first washing device is controlled to rotate at a third set rotating speed.

Preferably, the third set rotating speed is less than 50 rpm.

More preferably, the third set rotating speed is less than 30 rpm.

By the adoption of the above technical solution, compared with the prior art, the present disclosure has the following beneficial effects that:

1, the control method of the multi-drum washing machine of the present disclosure solves the problem of damage to soft laundries due to the agitating type washing or the beating type washing. Multiple sets of mutually connected washing devices are used in the present disclosure, when at least one washing device oscillates, other at least one washing device and the washing water and laundries therein are driven to oscillate, and the vibration or jumping of the washing water in the drum is used to realize the function of soft washing of the laundries; and 2, according to the control method of the multi-drum washing machine of the present disclosure, by the mutual oscillating washing between two sets of washing devices in the washing process, when the second washing device drives the first washing device to perform the oscillating washing, the first washing device basically does not rotate, so that the energy consumption is reduced, and the energy utilization rate of the washing machine is increased.

DETAILED DESCRIPTION OF THE EMBODIMENTS

In order to make the above objectives, features and advantages of the present disclosure more obvious and understandable, the present disclosure is further described in detail below in combination with accompanying drawings and specific implementations.

Figure 1:
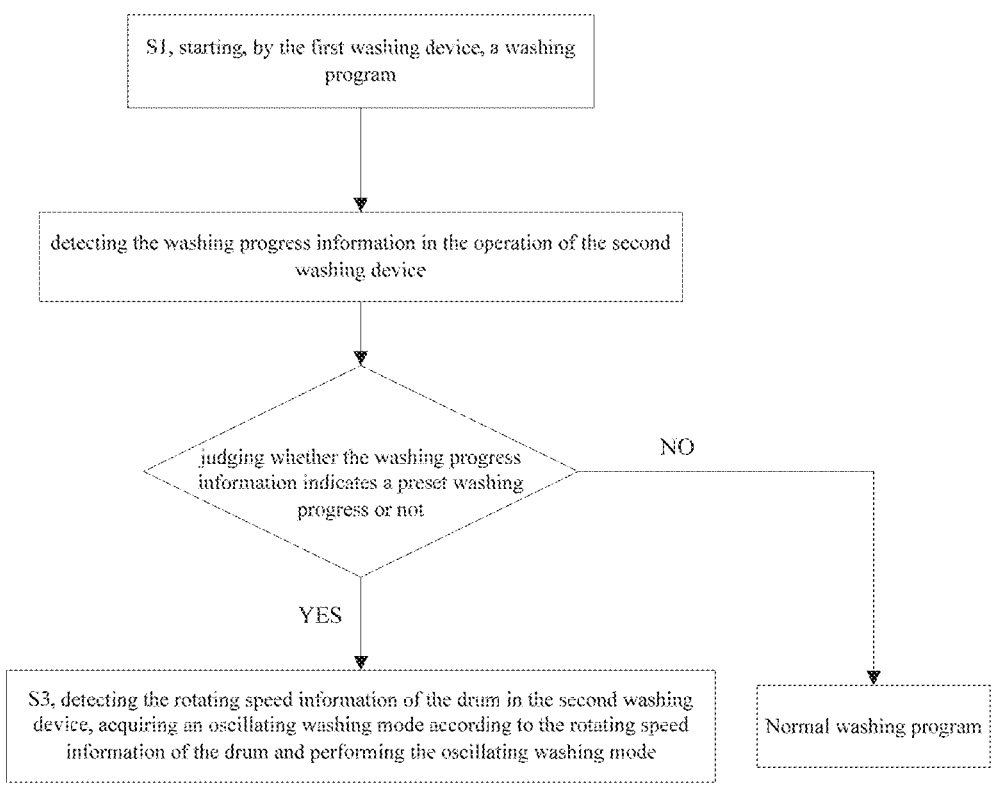
FIG. 1 is a flowchart of a control method of a multi-drum washing machine of the embodiment of the present disclosure.
Figure 2:
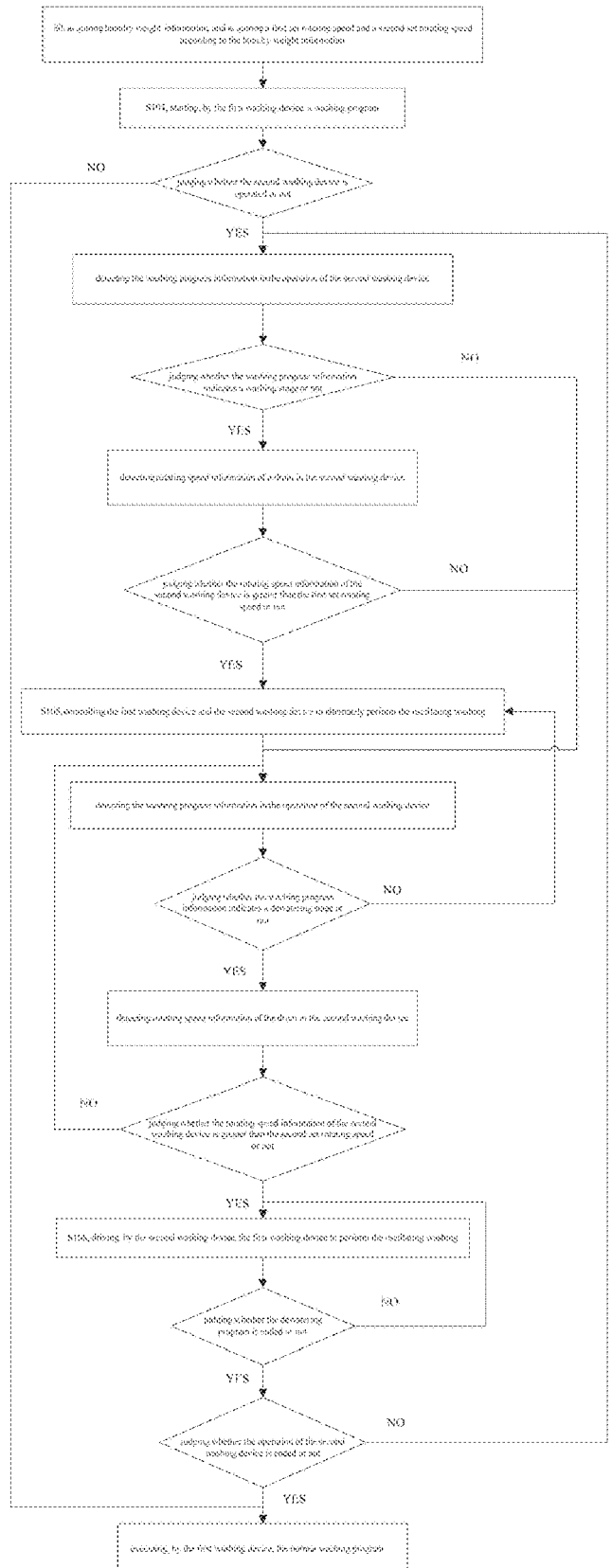
FIG. 2 is a flowchart of a control method of a multi-drum washing machine of another embodiment of the present disclosure.

As shown in FIGS. 1 and 2, the present disclosure provides a control method of a multi-drum washing machine. The multi-drum washing machine includes at least two sets of washing devices. The control method includes setting an oscillating program on the multi-drum washing machine. In the oscillating program oscillation generated by at least one washing device is used as an oscillating source to drive washing water and laundries in other at least one washing device to generate an interaction and achieve a washing effect.

Specifically, the multi-drum washing machine in the present embodiment includes at least two sets of washing devices. All washing devices are integrally connected or rigidly connected. All the washing devices are independently disposed, and all the washing devices are rigidly connected, and are disposed in parallel or are arranged into an array.

Or, a common outer drum is arranged in the multi-drum washing machine, and at least two inner drums are arranged in the outer drum to form an integrally connected structure. The inner drums are disposed in parallel or are arranged into an array.

Meanwhile, multiple sets of washing devices mutually connected are used in the control method of the present embodiment. When at least one washing device oscillates, other at least one washing device and the washing water and laundries in the washing device are driven to oscillate; and the vibration or jumping of the washing water in the drum is used to realize a function of soft washing of the laundries.

Further, the control method comprises detecting oscillation information of a second washing device serving as an oscillation source in operation, judging whether a first washing device executes the oscillating program according to the oscillation information, and performing oscillating washing by cooperation with the second washing device;

or, the control method comprises setting the oscillation information of the second washing device executing the oscillating program and serving as an oscillating source, and the first washing device is controlled to cooperate with the second washing device to perform the oscillating washing.

Specifically, according to the control method in the present disclosure, when the second washing device oscillates, the first washing device is driven to oscillate, and the washing water in a drum in the first washing device is also driven to vibrate and even jump, so that the function of soft washing is realized by an interaction generated between the vibration or jumping of the washing water and the laundries in the drum in the first washing device, and the problems such as loosening or terylene breakage and fuzziness to the laundries due to the high-speed rotation of the drum are avoided.

Meanwhile, in the present embodiment, by mutual oscillating washing between the two sets of washing devices in a washing process, when the second washing device drives the first washing device to perform the oscillating washing, the first washing device basically does not rotate, so that the energy consumption is reduced, and the energy utilization rate of the washing machine is increased.

Or, the control method in the present embodiment includes that a user actively sets execution of the oscillating program and the oscillation information corresponding to the second washing device during the execution of the oscillating program. The oscillation information includes a rotating speed, a washing mode and the like of the second washing device, and the first washing device is controlled to cooperate with the second washing device to perform the oscillating washing. The control method of the present embodiment further meets demands of the user.

Further, the control method also includes that after the first washing device executes the oscillating program, the oscillation information of the second washing device is acquired, and an oscillating washing mode is acquired according to the oscillation information and then is performed.

Preferably, the oscillation information corresponds to the oscillating washing mode, and a corresponding relation thereof is stored in the washing machine.

Further, the oscillation information includes washing progress information, and/or rotating speed information of a drum in a washing device.

Preferably, the washing progress information includes one or any combination of a soaking stage, a washing stage, a rinsing stage or a dewatering stage.

Specifically, in the present embodiment, the washing water and laundries in the first washing device is driven to oscillate only when the oscillation of the second washing device reaches a set value; and furthermore, in the washing process, the second washing device drives the washing water and laundries in the first washing device to oscillate simultaneously and play a role in cleaning the laundries only when the washing progress information and/or the rotating speed information reach/reaches a set value. Furthermore, the set values respectively corresponding to the washing progress information and the rotating speed information correspond to cleaning effects, desired by the user, of the first washing device, and a corresponding relation is stored in the washing machine. For example, the desired cleaning effects of the first washing device include soft, super soft and the like.

Further, the oscillating washing mode includes one or any combination of situations that the second washing device drives the first washing device to perform the oscillating washing, or the first washing device and the second washing device alternately perform the oscillating washing.

Specifically, in the present embodiment, the mode that the second washing device drives the first washing device to perform the oscillating washing is that the second washing device drives the first washing device to perform the oscillating washing all the time, so only the first washing device performs the oscillating washing. The mode that the first washing device and the second washing device alternately perform the oscillating washing is that the first washing device and the second washing device alternately perform the oscillating washing according to a set time. When the first washing device performs the oscillating washing, the rotating speed of the first washing device is reduced, and the first washing device is driven by the second washing device at a relatively high rotating speed to perform the oscillating washing for a first set time; after the first set time, the rotating speed of the second washing device is reduced, and the rotating speed of the first washing device is increased, and then the first washing device drives the second washing device to perform the washing for a second set time; and therefore, by the sequentially alternate oscillating washing, a balanced washing effect is achieved between the first washing device and the second washing device to save the energy to the maximum extent.

Further, the control method includes the following steps:

S1, the first washing device starts a washing program;

S2, the washing progress information in the operation of the second washing device is detected, whether the washing progress information indicates a preset washing progress is judged, if YES, Step S3 is executed, and if NO, a normal washing program is executed; and S3, rotating speed information of a drum in the second washing device is detected, and an oscillating washing mode is acquired according to the rotating speed information of the drum and then is performed.

Specifically, in the present embodiment, the control method detects the washing progress information of the second washing device and the rotating speed information of the drum in sequence, and acquires the oscillating washing mode of the first washing device according to the washing progress information of the second washing device and the rotating speed information of the drum and performs the oscillating washing mode. After the washing progress information and the rotating speed information of the drum are detected in sequence, the oscillating washing is performed only when the washing progress information and the rotating speed information of the drum reach preset values in sequence, thereby enhancing the washing effect of the oscillating washing.

Further, the preset washing progress in Step S2 includes a washing progress, and/or a dewatering progress.

Further, the rotating speed information of the drum in Step S3 corresponds to the oscillating washing mode, and a corresponding relation thereof is stored in the washing machine.

Further, if the washing progress information in Step S2 indicates the washing progress and the rotating speed information of the drum in Step S3 is greater than a first set rotating speed, the oscillating washing mode is that the first washing device and the second washing device alternately perform the oscillating washing or the second washing device drives the first washing device to perform the oscillating washing.

Preferably, the first set rotating speed is in a range from 100 to 350 rpm.

More preferably, the first set rotating speed is in a range from 200 to 300 rpm.

Specifically, the control method in the present embodiment summaries according to experimental data that only when the rotating speed of the second washing device reaches the first set rotating speed in the washing progress of the second washing device, the first washing device is driven to achieve the expected oscillating washing effect while guaranteeing the washing effect of the second washing device.

Further, if the washing progress information in Step S2 indicates the dewatering stage, and the rotating speed information of the drum in Step S3 is greater than a second set rotating speed, the oscillating washing mode is that the second washing device drives the first washing device to perform the oscillating washing.

Preferably, the second set rotating speed is greater than 500 rpm.

More preferably, the second set rotating speed is greater than 600 rpm.

Specifically, the control method in the present embodiment summaries according to experimental data that only when the rotating speed of the second washing device reaches the second set rotating speed in the dewatering stage of the second washing device, the first washing device is driven to achieve the expected oscillating washing effect while guaranteeing the dewatering effect of the second washing device.

Further, when the oscillating washing mode in Step S3 is that the second washing device drives the first washing device to perform the oscillating washing or the first washing device and the second washing device alternately perform the oscillating washing, the first washing device is controlled to rotate at a third set rotating speed.

Preferably, the third set rotating speed is less than 50 rpm.

Preferably, the third set rotating speed is less than 30 rpm.

Specifically, according to the control method of the present embodiment, when the first washing device performs the oscillating washing, the rotating speed of the first washing device is reduced so as to guarantee the oscillating washing effect of the first washing device. The first washing device is preferably maintained in a basically static state, so that the oscillating washing effect is the best, and the energy consumption of the washing machine is reduced to the maximum extent.

Further, in the present embodiment, before Step S1, the control method includes a Step S0: laundry weight information is acquired, and a first set rotating speed, a second set rotating speed and a third set rotating speed are acquired according to the laundry weight information.

Preferably, the laundry weight information corresponds to the first set rotating speed, the second set rotating speed and the third set rotating speed, and a corresponding relation thereof is stored in the washing machine.

Specifically, in the present embodiment, the heavier the laundries in the washing device are, the higher the first set rotating speed, the second set rotating speed and the third set rotating speed are, thereby guaranteeing the oscillating washing effect of the washing device.

According to the foregoing, the control method of the multi-drum washing machine of the present embodiment has the following advantages that:

1, the control method of the multi-drum washing machine of the present embodiment solves the problem of washing damage to soft laundries due to the agitating type washing or the beating type washing; the plurality of sets of mutually connected washing devices are used in the present embodiment; when at least one washing device oscillates, other at least one washing device and the washing water and laundries in the washing device are driven to oscillate; and the vibration or jumping of the washing water in the drum is used to realize the function of soft washing of the laundries; and 2, according to the control method of the multi-drum washing machine of the present embodiment, by the mutual oscillating washing between two sets of washing devices in the washing process, when the second washing device drives the first washing device to perform the oscillating washing, the first washing device basically does not rotate, so that the energy consumption is reduced, and the energy utilization rate of the washing machine is increased.

Embodiment II

As shown in FIG. 2, a difference between the present embodiment and the above embodiment is that the control method of the multi-drum washing machine in the present embodiment includes the following steps that:

S0: laundry weight information is acquired, and a first set rotating speed, a second set rotating speed and a third set rotating speed are acquired according to the laundry weight information;

S101: a first washing device starts a washing program;

S102: whether a second washing device is operated is judged, if YES, Step S103 is executed, and if NO, the first washing device executes a normal washing program;

S103: washing progress information in the operation of the second washing device is detected, whether the washing progress information indicates a washing progress is judged, if YES, Step S104 is executed, and if NO, Step S106 is executed;

S104: rotating speed information of a drum in the second washing device is detected, whether the rotating speed information of the second washing device is greater than the first set rotating speed is judged, if YES, Step S105 is executed, and if NO, Step S106 is executed;

S105: the first washing device and the second washing device are controlled to alternately perform the oscillating washing;

S106: washing progress information in the operation of the second washing device is detected, whether the washing progress information indicates a dewatering stage is judged, if YES, Step S107 is executed, and if NO, Step S105 is executed;

S107: rotating speed information of the drum in the second washing device is detected, whether the rotating speed information of the second washing device is greater than the second set rotating speed is judged, if YES, Step S108 is executed, and if NO, Step S106 is executed;

S108: the second washing device drives the first washing device to perform the oscillating washing;

S109: whether the dewatering stage is ended is judged, if YES, Step S110 is executed, and if NO, Step S108 is executed;

S110: whether the operation of the second washing device is ended is judged, if YES, the first washing device executes the normal washing program, and if NO, Step S103 is executed.

In the present embodiment, the control method fully detects the operation condition of the washing machine, detect the washing progress information of the washing machine for multiple times, and ensure that the second washing device fully drives the first washing device to perform washing in the washing progress and the dewatering progress, and ensure that the first washing device fully performs the oscillating washing according to the real-time washing situation of the second washing device.

Embodiment III

A difference between the present embodiment and the above embodiment is that the control method in the present embodiment also includes that: in Step S2, if the washing progress information does not indicate a preset washing progress, judgment about whether the second washing device performs the washing or dewatering stage within a set waiting time continues, if YES, it is necessary to wait for the second washing device to perform the preset washing progress and then Step S3 is executed, and if NO, the normal program is executed.

Or, in Step S103, when the washing progress information does not indicate the washing progress, judgment about whether the second washing device performs the washing progress within a set waiting time continues, if YES, it is necessary to wait for the second washing device to perform the washing progress and then Step S104 is executed, and if NO, Step S105 is executed.

Another or, in Step S106, when the washing progress information does not indicate the dewatering stage, judgment about whether the second washing device performs the dewatering stage within set waiting time continues, if YES, it is necessary to wait for the second washing device to perform the dewatering stage and then Step S107 is executed, and if NO, Step S105 is executed.

The control method of the present embodiment makes full use of the oscillating effect between the first washing device and the second washing device to realize full utilization of the energy of the washing machine, thereby reducing the energy consumption of the washing machine.

Embodiment IV

A difference between the present embodiment and the above embodiment is that before Step S1 or S0, the control method also includes that: Step S00: laundry material information is acquired;

then Step S3: rotating speed information of a drum in the second washing device is detected, and an oscillating washing mode is acquired according to the rotating speed information of the drum and the material information and then is performed.

For example, when the laundries in the first washing device are made of soft materials, and the laundries in the second washing device are made of ordinary materials, the oscillating washing mode is that the second washing device drives the first washing device to perform the oscillating washing, and the mode that the first washing device and the second washing device alternately perform the oscillating washing is not performed.

Or, a first set rotating speed, a second set rotating speed and a third set rotating speed are acquired according to the laundry material information and the laundry weight information.

In the present embodiment, the softer the laundry material is, the lower the first set rotating speed, the second set rotating speed and the third set rotating speed are. For example, the first set rotating speed, second set rotating speed and third set rotating speed corresponding to cashmere laundries are respectively less than the first set rotating speed, second set rotating speed and third set rotating speed corresponding to real silk laundries.

The implementations in the above embodiments may be further combined or substituted, and the embodiments are merely described for the preferred embodiments of the present disclosure, and are not intended to limit the concept and scope of the present disclosure. Various changes and modifications that are made by those skilled in the art to the technical solutions of the present disclosure without departing from the design idea of the present disclosure shall be all fall within the protection scope of the present disclosure.

The invention claimed is:

1. A control method of a multi-drum washing machine, the multi-drum washing machine including a first washing device and a second washing device, the control method comprising:
    setting an oscillating program in the multi-drum washing machine;
    detecting oscillation information of the second washing device serving as a oscillation source in operation;
    judging whether the first washing device executes the oscillating program according to the oscillation information; and
    the first washing device performing oscillating washing by cooperation with the second washing device, wherein
    in the oscillating program, oscillation generated by the second washing device is used as the oscillating source to drive washing water and laundries in the first washing device to generate an interaction with each other for washing.

2. The control method of the multi-drum washing machine according to claim 1, wherein the control method comprises: acquiring the oscillation information of the second washing device after the first washing device is controlled to execute the oscillating program, and acquiring an oscillating washing mode according to the oscillation information and performing the oscillating washing mode.

3. The control method of the multi-drum washing machine according to claim 1, wherein the oscillation information comprises washing progress information, and/or rotating speed information of a drum in the first washing device or the second washing device.

4. The control method of the multi-drum washing machine according to claim 1, wherein the control method comprises:
    S1, starting a washing program of the first washing device;
    S2, detecting the washing progress information in the operation of the second washing device, judging whether the washing progress information indicates a preset washing progress, if YES, executing a Step S3, and if NO, executing a normal washing program; wherein
    S3, detecting the rotating speed information of the drum in the second washing device, acquiring the oscillating washing mode according to the rotating speed information of the drum and performing the oscillating washing mode.

5. The control method of the multi-drum washing machine according to claim 4, wherein the preset washing progress in Step S2 comprises a washing progress, and/or a dewatering progress.

6. The control method of the multi-drum washing machine according to claim 4, wherein the oscillating washing mode comprises:
    the second washing device driving the first washing device to perform the oscillating washing, or
    the first washing device and the second washing device being controlled to alternately perform the oscillating washing, or
    the second washing device driving the first washing device to perform the oscillating washing, and the first washing device and the second washing device being controlled to alternately perform the oscillating washing.

7. The control method of the multi-drum washing machine according to claim 4, wherein:
    if the washing progress information in Step S2 indicates the washing progress, and a rotating speed shown in the rotating speed information of the drum in Step S3 is greater than a first set rotating speed, the oscillating washing mode is that the first washing device and the second washing device is controlled to alternately perform the oscillating washing or the second washing device drives the first washing device to perform the oscillating washing.

8. The control method of the multi-drum washing machine according to claim 7, wherein the first set rotating speed is in a range from 100 to 350 rpm.

9. The control method of the multi-drum washing machine according to claim 7, wherein the first set rotating speed is in a range from 200 to 300 rpm.

10. The control method of the multi-drum washing machine according to claim 4, wherein:
    if the washing progress information in Step S2 indicates the dewatering stage, and a rotating speed shown in the rotating speed information of the drum in Step S3 is greater than a second set rotating speed, the oscillating washing mode is that the second washing device drives the first washing device to perform the oscillating washing.

11. The control method of the multi-drum washing machine according to claim 10, wherein: the second set rotating speed is greater than 500 rpm.

12. The control method of the multi-drum washing machine according to claim 10, wherein: the second set rotating speed is greater than 600 rpm.

13. The control method of the multi-drum washing machine according to claim 4, wherein:
    if the oscillating washing mode in Step S3 is that the second washing device drives the first washing device to perform the oscillating washing or the first washing device and the second washing device is controlled to alternately perform the oscillating washing, the first washing device is controlled to rotate at a third set rotating speed.

14. The control method of the multi-drum washing machine according to claim 13, wherein: the third set rotating speed is less than 50 rpm.

15. The control method of the multi-drum washing machine according to claim 13, wherein: the third set rotating speed is less than 30 rpm.

16. The control method of the multi-drum washing machine according to claim 4, wherein the rotating speed information of the drum in Step S3 corresponds to the oscillating washing mode, and a corresponding relationship between the rotating speed information of the drum and the oscillating washing mode thereof is stored in the multi-drum washing machine.

17. The control method of the multi-drum washing machine according to claim 1, wherein the washing progress information comprises one or more than one stage selected from a group consisting of a soaking stage, a washing stage, a rinsing stage and a dewatering stage.

18. A control method of a multi-drum washing machine, the multi-drum washing machine including a first washing device and a second washing device, the control method comprising:

setting an oscillating program in the multi-drum washing machine;

setting oscillation information corresponding to the second washing device executing the oscillating program and serving as a oscillating source; and the first washing device performing the oscillating washing by cooperation with the second washing device, wherein in the oscillating program, oscillation generated by the second washing device is used as the oscillating source to drive washing water and laundries in the first washing device to generate an interaction with each other for washing.

19. The control method of the multi-drum washing machine according to claim 18, wherein the control method comprises: acquiring the oscillation information of the second washing device after the first washing device is controlled to execute the oscillating program, and acquiring an oscillating washing mode according to the oscillation information and performing the oscillating washing mode.

20. The control method of the multi-drum washing machine according to claim 18, wherein the control method comprises:

S1, starting a washing program of the first washing device;

S2, detecting the washing progress information in the operation of the second washing device, judging whether the washing progress information indicates a preset washing progress, if YES, executing a Step S3, and if NO, executing a normal washing program; wherein S3, detecting the rotating speed information of the drum in the second washing device, acquiring the oscillating washing mode according to the rotating speed information of the drum and performing the oscillating washing mode.

* * * * *